US012601170B2

(12) United States Patent
Deshpande et al.

(10) Patent No.: US 12,601,170 B2
(45) Date of Patent: Apr. 14, 2026

(54) ACOUSTICAL BUILDING PANEL AND SURFACE COVERING SYSTEMS UTILIZING THE SAME

(71) Applicant: ARMSTRONG WORLD INDUSTRIES, INC., Lancaster, PA (US)

(72) Inventors: Ravindra Deshpande, Lancaster, PA (US); Anthony L. Wiker, Lancaster, PA (US)

(73) Assignee: AWI Licensing LLC, Wilmington, DE (US)

( * ) Notice: Subject to any disclaimer, the term of this patent is extended or adjusted under 35 U.S.C. 154(b) by 301 days.

(21) Appl. No.: 17/940,219

(22) Filed: Sep. 8, 2022

(65) Prior Publication Data

US 2023/0076832 A1 Mar. 9, 2023

Related U.S. Application Data

(60) Provisional application No. 63/241,691, filed on Sep. 8, 2021.

(51) Int. Cl.
*E04B 1/86* (2006.01)
*E04B 1/84* (2006.01)
(Continued)

(52) U.S. Cl.
CPC ................ *E04B 1/86* (2013.01); *E04B 1/942* (2013.01); *E04F 13/0875* (2013.01);
(Continued)

(58) Field of Classification Search
CPC .... E04B 1/86; E04B 1/942; E04B 2001/8461; E04B 9/04; E04B 2103/04; E04F 13/0875; E04F 2290/043; G10K 11/162
See application file for complete search history.

(56) References Cited

U.S. PATENT DOCUMENTS 1,119,543 A * 12/1914 Gustavson ................ E04B 1/86 52/378
6,475,315 B1 11/2002 Kean
(Continued)

FOREIGN PATENT DOCUMENTS

CN 111038039 A 4/2020
WO 2020/034482 11/2020

*Primary Examiner* — Forrest M Phillips
(74) *Attorney, Agent, or Firm* — Patrick Sheldrake

(57) ABSTRACT

Described herein are building panels and surface covering systems useful for spaces requiring acoustic control and design flexibility, and methods to prepare the same. Such building panels and surface covering systems comprise an building panel having a first major surface opposite a second major surface and a side surface extending there-between, the acoustic building panel comprising a body having an upper surface opposite a lower surface and side surfaces extending there-between; backing having a first side opposite a second side and comprising denim web and a low-melt polyester bicomponent fiber; wherein the first side of the denim web backing is in contact with the upper surface of the body; and wherein the denim web backing has a web basis weight from about 1150 to about 1350 g/m$^2$. In certain embodiments, building panels and surface covering systems have superior fire resistant qualities.

20 Claims, 6 Drawing Sheets

(51) Int. Cl.

| | |
|---|---|
| ***E04B 1/94*** | (2006.01) |
| ***E04B 9/04*** | (2006.01) |
| ***E04F 13/08*** | (2006.01) |
| ***G10K 11/162*** | (2006.01) |

(52) U.S. Cl.

CPC .... *G10K 11/162* (2013.01); *E04B 2001/8461* (2013.01); *E04B 9/04* (2013.01); *E04B 2103/04* (2013.01); *E04F 2290/043* (2013.01)

(56) References Cited

U.S. PATENT DOCUMENTS

| | | | | |
|---|---|---|---|---|
| 2004/0065507 | A1 | 4/2004 | Jacobsen | |
| 2004/0118633 | A1 * | 6/2004 | Evans | E04B 1/86 181/290 |
| 2009/0117801 | A1 * | 5/2009 | Flack | B32B 5/26 442/364 |
| 2012/0125711 | A1 | 5/2012 | Stahr | |
| 2013/0078422 | A1 * | 3/2013 | Tinianov | B32B 5/26 442/381 |
| 2019/0108826 | A1 * | 4/2019 | Henderson | E04B 1/84 |
| 2020/0002941 | A1 | 1/2020 | Oleske | |
| 2020/0270861 | A1 * | 8/2020 | Bartella | E04B 9/001 |
| 2023/0048961 | A1 * | 2/2023 | Frantz | E04B 1/86 |

* cited by examiner

ACOUSTICAL BUILDING PANEL AND SURFACE COVERING SYSTEMS UTILIZING THE SAME

CROSS-REFERENCE TO RELATED APPLICATIONS

This application claims the benefit of U.S. Provisional Patent Application No. 63/241,691 filed on Sep. 8, 2021. The disclosure of the above application is incorporated herein by reference.

FIELD OF THE DISCLOSURE

The present disclosure relates to acoustical panels for use in building materials, and more particularly to environmentally sustainable highly acoustical nonwoven composite panels having superior fire resistant qualities.

BACKGROUND

Surface coverings are used for a variety of reasons, including to cover up imperfections in an underlying surface, to display a desired aesthetic, and to introduce acoustical solutions, such as providing beneficial sound absorption. Examples of such surface coverings includes flooring that covers a subfloor, ceiling panels that cover a ceiling or plenum, and wall panels that cover a wall. Such surface coverings may be provided in various shapes, sizes, colors, and forms in order to meet aesthetic and acoustical requirements.

However, surface coverings can be energetically costly to produce, thus making use of such products burdensome on the environment. It would be beneficial to obtain surface coverings which are environmentally sustainable while also providing for improved acoustical characteristics, such as having beneficial Noise Reduction Coefficient (NRC), and simultaneous conformance with building flammability regulations.

Thus, there is a need for improved surface coverings having environmentally beneficial characteristics without compromising acoustical or fire preventive properties. Embodiments of the present invention are directed to meeting these needs.

SUMMARY

This summary is intended merely to introduce a simplified summary of some aspects of one or more implementations of the present disclosure. Further areas of applicability of the present disclosure will become apparent from the detailed description provided hereinafter. This summary is not an extensive overview, nor is it intended to identify key or critical elements of the present teachings, nor to delineate the scope of the disclosure. Rather, its purpose is merely to present one or more concepts in simplified form as a prelude to the detailed description below.

Applicants have discovered acoustic building panels useful to display a desired aesthetic quality and to introduce acoustical solutions. Such acoustic building panels also provide for beneficial fire preventive characteristics.

Thus, in certain embodiments, the present invention provides an acoustic building panel comprising a first major surface opposite a second major surface and a side surface extending there-between, the acoustic building panel comprising a body comprising an upper surface opposite a lower surface and a side surface extending there-between; a backing having a first side opposite a second side and comprising denim web and a low-melt polyester bicomponent fiber; wherein the first side of the denim web backing is in contact with the upper surface of the body; and wherein the denim web backing has a web basis weight from about 1150 to about 1350 g/m$^2$. In certain embodiments, the body comprises a nonwoven material. In certain embodiments, the body comprises aspen wood, non-woven perforated metal, or wood. In certain embodiments, the body comprises aspen wood excelsior. In certain embodiments, the distance between the upper surface and lower surface is about 0.8 inches to about 2.5 inches. In certain embodiments, the distance between the upper surface and lower surface is about 0.8 inches to about 1.2 inches. In certain embodiments, the distance between the upper surface and lower surface is about 1.0 inch. In certain embodiments, the low-melt polyester bicomponent fiber comprises copolyester polyethylene terephthalate/polyethylene terephthalate (co-PET/PET). In certain embodiments, the low-melt polyester bicomponent fiber is present from about 10% to about 35%, by weight of the backing. In certain embodiments, the low-melt polyester bicomponent fiber is present from about 28% to about 33%, by weight of the backing. In certain embodiments, the denim web is present from about 65% to about 75%, by weight of the backing. In certain embodiments, the acoustic building panel further comprises a fire retardant. In certain embodiments, the fire retardant comprises ammonium sulfate, ammonium phosphate, borates, or a combination thereof. In certain embodiments, the fire retardant is present from about 10% to about 20%, by weight. In certain embodiments, the fire retardant is present from about 12% to about 15%, by weight. In certain embodiments, the acoustic building panel has a noise reduction coefficient (NRC) of about 0.80, as determined in an A mount. In certain embodiments, the acoustic building panel has a noise reduction coefficient (NRC) of about 0.80, as determined in a D-20 mount. In certain embodiments, the acoustic building panel has a flame spread index (FSI) of about 25, as determined by ASTM E84-20. In certain embodiments, the acoustic building panel has a smoke developed index (SDI) of about 15, as determined by ASTM E84-20. In certain embodiments, the acoustic building panel does not induce an itchiness upon handling of the panel. In certain embodiments, the acoustic building panel is a wall or ceiling panel.

In other embodiments, the invention is an acoustic building panel having a first major surface opposite a second major surface and a side surface extending there-between, the acoustic building panel comprising a body having an upper surface opposite a lower surface and a side surface extending there-between; a backing having a first side opposite a second side and comprising denim web and a low-melt polyester bicomponent fiber; wherein the first side of the denim web backing is in contact with the upper surface of the body; ammonium sulfate; and wherein the denim web backing has a web basis weight from about 1150 to about 1350 g/m$^2$. In certain embodiments, the body comprises a nonwoven material. In certain embodiments, the body comprises aspen wood, non-woven perforated metal, or wood. In certain embodiments, the body comprises aspen wood *excelsior*. In certain embodiments, the distance between the upper surface and lower surface is about 0.8 inches to about 2.5 inches. In certain embodiments, the upper surface and lower surface is about 0.8 inches to about 1.2 inches. In certain embodiments, the upper surface and lower surface is about 1.0 inch. In certain embodiments, the low-melt polyester bicomponent fiber comprises copolyester polyethylene terephthalate/polyethylene terephthalate (coPET/PET). In certain embodiments, the low-melt polyester bicomponent fiber is present from about 10% to about 35%, by weight. In certain embodiments, the low-melt polyester bicomponent fiber is present from about 28% to about 33%, by weight. In certain embodiments, the denim web is present from about 65% to about 75%, by weight of the backing. In certain embodiments, the acoustic building panel further comprises a fire retardant. In certain embodiments, the fire retardant comprises ammonium sulfate, ammonium phosphate, borates, or a combination thereof. In certain embodiments, the fire retardant is present from about 10% to about 20%, by weight. In certain embodiments, the fire retardant is present from about 12% to about 15%, by weight. In certain embodiments, the acoustic building panel has a noise reduction coefficient (NRC) of about 0.80, as determined in an A mount. In certain embodiments, the acoustic building panel has a noise reduction coefficient (NRC) of about 0.80, as determined in a D-20 mount. In certain embodiments, the acoustic building panel has a flame spread index (FSI) of about 25, as determined by ASTM E84-20. In certain embodiments, the acoustic building panel has a smoke developed index (SDI) of about 15, as determined by ASTM E84-20. In certain embodiments, the acoustic building panel does not induce an itchiness upon handling of the panel. In certain embodiments, the acoustic building panel is a wall or ceiling panel.

In other embodiments, the invention is a surface covering system comprising a plurality of acoustic building panels, each of the panels comprising a first major surface opposite a second major surface and a side surface extending there-between, the acoustic building panel comprising a body having an upper surface opposite a lower surface and side surfaces extending there-between; a backing having a first side opposite a second side and comprising denim web and a low-melt polyester bicomponent fiber; wherein the first side of the denim web backing is in contact with the upper surface of the body; and wherein the denim web backing has a web basis weight from about 1150 to about 1350 g/m$^2$; and an adhesive tape configured to detachably couple the panels to a substrate, the adhesive tape comprising: a substrate-side adhesive component comprising at least one adhesive layer; a panel-side adhesive component comprising at least one adhesive layer; and a release component; and wherein the panels are detachably coupled to the substrate by the adhesive tape in a side-by-side arrangement to cover the substrate, the at least one adhesive layer of the substrate-side adhesive component being adhered to the substrate, the at least one adhesive layer of the panel-side adhesive component being adhered to the rear surfaces of the panels, and the release component being positioned between the substrate-side adhesive component and the panel-side adhesive component. In certain embodiments, the body comprises a nonwoven material. In certain embodiments, the body comprises aspen wood, non-woven perforated metal, or wood. In certain embodiments, the body comprises aspen wood excelsior. In certain embodiments, the distance between the upper surface and lower surface is about 0.8 inches to about 2.5 inches. In certain embodiments, the distance between the upper surface and lower surface is about 0.8 inches to about 1.2 inches. In certain embodiments, the distance between the upper surface and lower surface is about 1.0 inch. In certain embodiments, the low-melt polyester bicomponent fiber comprises copolyester polyethylene terephthalate/polyethylene terephthalate (coPET/PET). In certain embodiments, the low-melt polyester bicomponent fiber is present from about 10% to about 35%, by weight. In certain embodiments, the low-melt polyester bicomponent fiber is present from about 28% to about 33%, by weight. In certain embodiments, the denim web is present from about 65% to about 75%, by weight of the backing. In certain embodiments, the acoustic building panel further comprises a fire retardant. In certain embodiments, the fire retardant comprises ammonium sulfate, ammonium phosphate, borates, or a combination thereof. In certain embodiments, the fire retardant is present from about 10% to about 20%, by weight. In certain embodiments, the fire retardant is present from about 12% to about 15%, by weight. In certain embodiments, the acoustic building panel has a noise reduction coefficient (NRC) of about 0.80, as determined in an A mount. In certain embodiments, the acoustic building panel has a noise reduction coefficient (NRC) of about 0.80, as determined in a D-20 mount. In certain embodiments, the acoustic building panel has a flame spread index (FSI) of about 25, as determined by ASTM E84-20. In certain embodiments, the acoustic building panel has a smoke developed index (SDI) of about 15, as determined by ASTM E84-20. In certain embodiments, the acoustic building panel does not induce an itchiness upon handling of the panel. In certain embodiments, the acoustic building panel is a wall or ceiling panel.

In other embodiments, the invention is a method of preparing an acoustical building panel as described herein, comprising: mixing a denim web and a low-melt polyester bicomponent fiber to form a uniform backing composition; applying the backing composition to the upper surface of the body, wherein the body comprises a non-woven material; applying a fire retardant to the backing composition and the body; and applying heat and pressure to the fire retardant containing backing composition and body to form an acoustical building panel.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

DESCRIPTION OF THE DRAWINGS

The detailed description of the invention will be better understood when read in conjunction with the appended drawings. It should be understood, however, that the invention is not limited to the precise arrangements and instrumentalities of the embodiments shown in the drawings.

DETAILED DESCRIPTION

Figure 1:
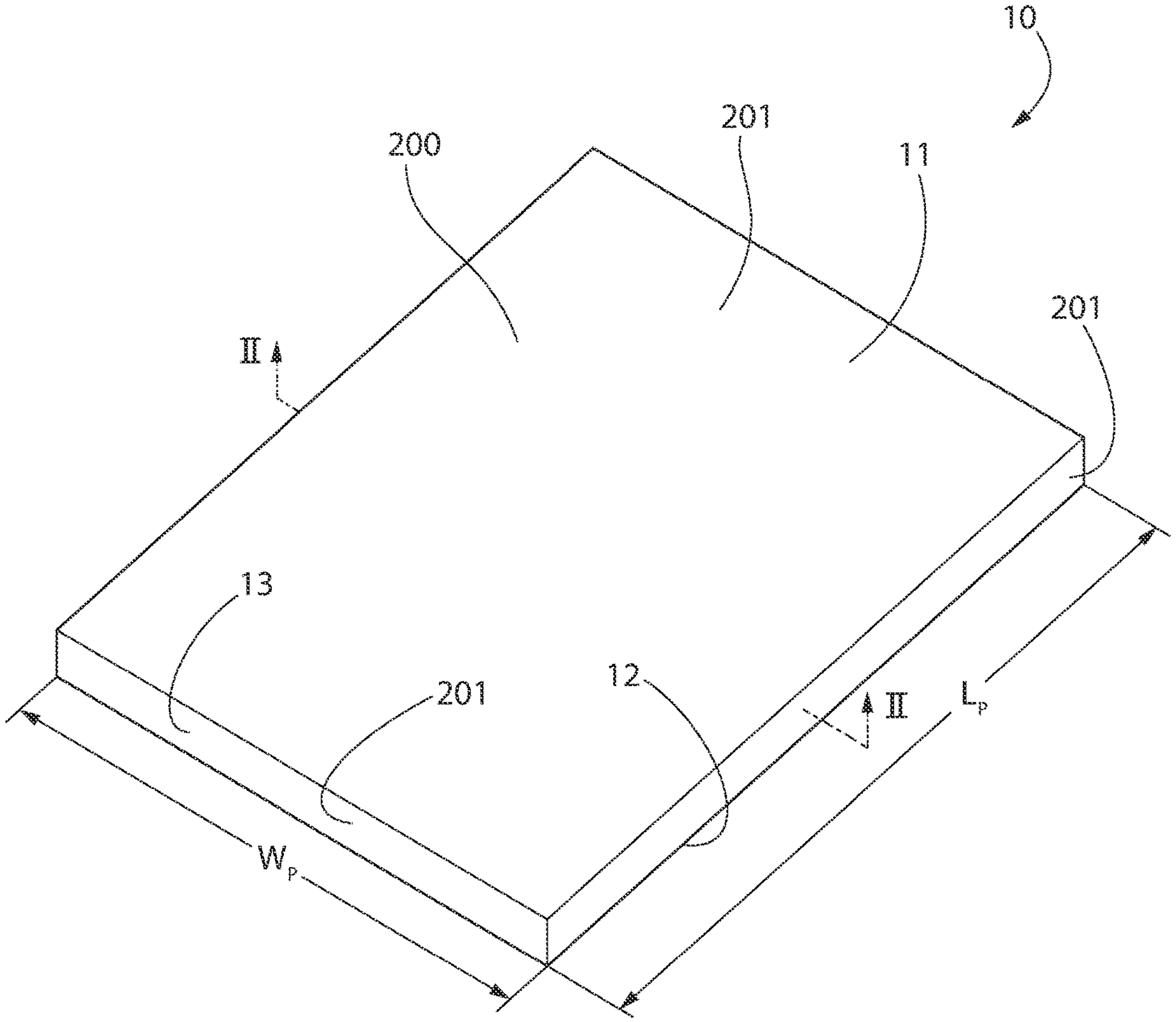
FIG. 1 is a top perspective view of a building panel according to one embodiment of the invention.

For illustrative purposes, the principles of the present invention are described by referencing various exemplary embodiments thereof. Although certain embodiments of the invention are specifically described herein, one of ordinary skill in the art will readily recognize that the same principles are equally applicable to, and can be employed in other applications and methods. It is to be understood that the invention is not limited in its application to the details of any particular embodiment shown. The terminology used herein is for the purpose of description and not to limit the invention, its application, or uses.

As used herein and in the appended claims, the singular forms "a", "an", and "the" include plural references unless the context dictates otherwise. The singular form of any class of the ingredients refers not only to one chemical species within that class, but also to a mixture of those chemical species. The terms "a" (or "an"), "one or more" and "at least one" may be used interchangeably herein. The terms "comprising", "including", "containing", and "having" may be used interchangeably. The term "include" should be interpreted as "include, but are not limited to". The term "including" should be interpreted as "including, but are not limited to".

As used throughout, ranges are used as shorthand for describing each and every value that is within the range. Any value within the range can be selected as the terminus of the range.

Unless otherwise specified, all percentages and amounts expressed herein and elsewhere in the specification should be understood to refer to percentages by weight of the total composition. Unless otherwise specified, reference to a molecule, or to molecules, being present at a "wt. %" refers to the amount of that molecule, or molecules, present in the composition based on the total weight of the composition.

According to the present application, use of the term "about" in conjunction with a numeral value refers to a value that may be +/−5% of that numeral. As used herein, the term "substantially free" is intended to mean an amount less than about 5.0 wt. %, less than 3.0 wt. %, 1.0 wt. %; preferably less than about 0.5 wt. %, and more preferably less than about 0.25 wt. % of the composition.

Unless defined otherwise, all technical and scientific terms used herein have the same meanings as commonly understood by one of ordinary skill in the art to which this invention belongs. All patents, patent applications, publications, and other references cited or referred to herein are incorporated by reference in their entireties for all purposes. In the event of a conflict in a definition in the present disclosure and that of a cited reference, the present disclosure controls.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivatives thereof (e.g., "horizontally," "downwardly," "upwardly," etc.) should be construed to refer to the orientation as then described or as shown in the drawing (if applicable) under discussion. These relative terms are for convenience of description only and, unless specified otherwise, do not require that the apparatus be constructed or operated in a particular orientation.

As used herein, terms such as "attached," "affixed," "connected," "coupled," "interconnected," and the like refer to a relationship wherein structures are secured or attached to one another either directly or indirectly through intervening structures, as well as both movable or rigid attachments or relationships, unless expressly described otherwise. Accordingly, the disclosure is not limited to such exemplary embodiments illustrating certain combinations of features that may exist alone or in combination with other features.

The present disclosure is directed towards building panels and surface covering systems useful to display a desired aesthetic quality and to introduce acoustical solutions. In certain aspects, such panels and systems further provide for beneficial acoustic properties. In certain aspects, such panels and systems further impart fire resistant properties.

In certain embodiments, the present invention is an acoustic building panel comprising a first major surface opposite a second major surface and a side surface extending there-between, the acoustic building panel comprising a body comprising an upper surface opposite a lower surface and a side surface extending there-between; a backing having a first side opposite a second side and comprising denim web and a low-melt polyester bicomponent fiber; wherein the first side of the denim web backing is in contact with the upper surface of the body; and wherein the denim web backing has a web basis weight from about 1150 to about 1350 g/m$^2$. In other embodiments, the invention is an acoustic building panel having a first major surface opposite a second major surface and a side surface extending there-between, the acoustic building panel comprising a body having an upper surface opposite a lower surface and a side surface extending there-between; a backing having a first side opposite a second side and comprising denim web and a low-melt polyester bicomponent fiber; wherein the first side of the denim web backing is in contact with the upper surface of the body; ammonium sulfate; and wherein the denim web backing has a web basis weight from about 1150 to about 1350 g/m$^2$. In further embodiments, the invention is a surface covering system comprising a plurality of acoustic building panels, each of the panels comprising a first major surface opposite a second major surface and a side surface extending there-between, the acoustic building panel comprising a body having an upper surface opposite a lower surface and side surfaces extending there-between; a backing having a first side opposite a second side and comprising denim web and a low-melt polyester bicomponent fiber; wherein the first side of the denim web backing is in contact with the upper surface of the body; and wherein the denim web backing has a web basis weight from about 1150 to about 1350 g/m$^2$; and an adhesive tape configured to detachably couple the panels to a substrate, the adhesive tape comprising a substrate-side adhesive component comprising at least one adhesive layer; a panel-side adhesive component comprising at least one adhesive layer; and a release component; and wherein the panels are detachably coupled to the substrate by the adhesive tape in a side-by-side arrangement to cover the substrate, the at least one adhesive layer of the substrate-side adhesive component being adhered to the substrate, the at least one adhesive layer of the panel-side adhesive component being adhered to the rear surfaces of the panels, and the release component being positioned between the substrate-side adhesive component and the panel-side adhesive component.

The acoustic building panel may be utilized in various aspects. In certain embodiments, the acoustic building panel is a wall panel. In certain embodiments, the acoustic building panel is a ceiling panel. In certain embodiments, the acoustic building panel is used as both a ceiling panel and a wall panel.

The body of the acoustic building panel may be made of varying components. In certain embodiments, the body comprises a nonwoven material. In certain embodiments, the body comprises excelsior material, which also refers to softwood shavings used for stuffing. In certain embodiments, the body comprises aspen wood, non-woven perforated metal, wood, or a combination thereof. In certain embodiments, the body comprises aspen wood excelsior.

Figure 2:
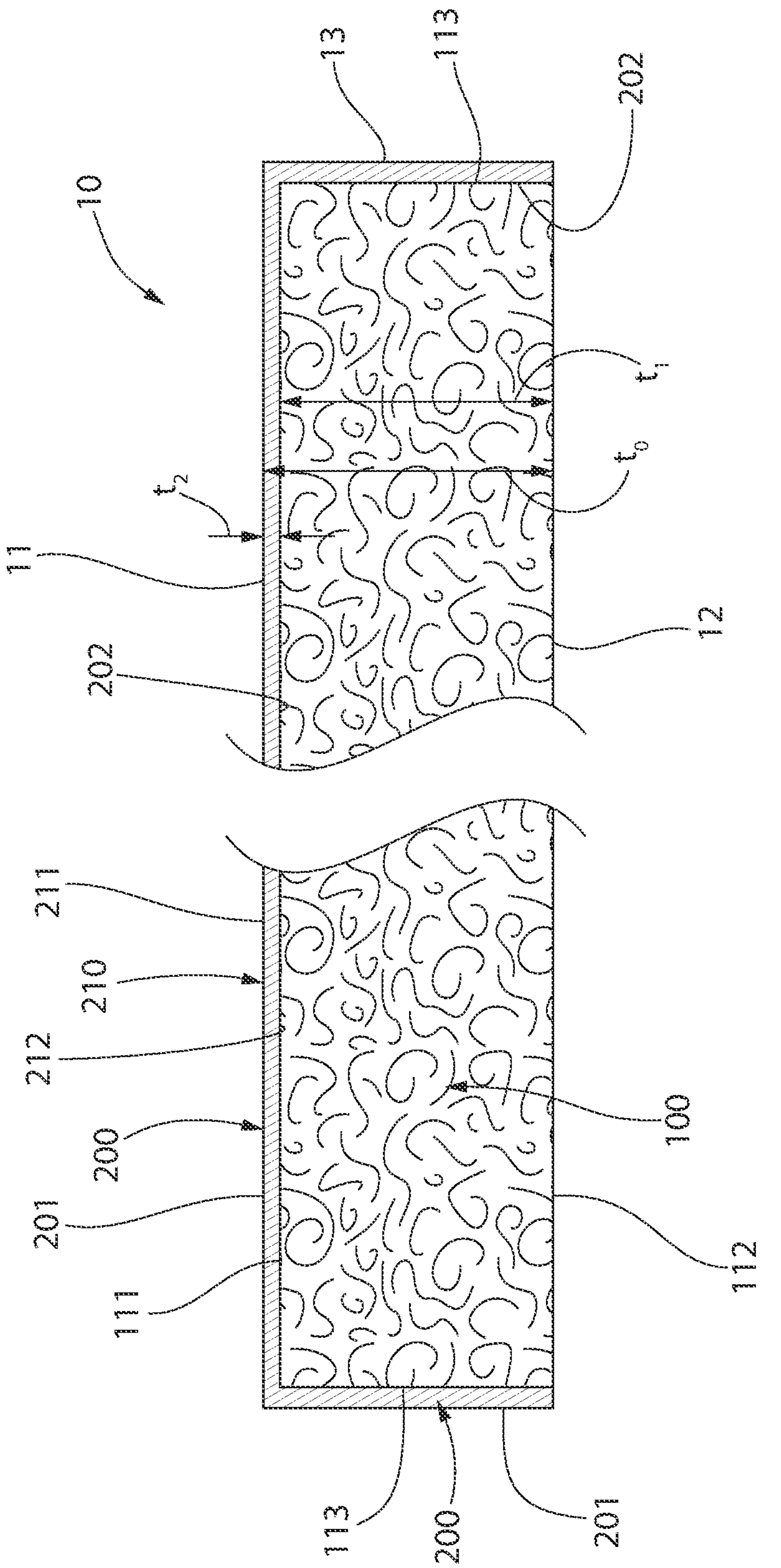
FIG. 2 is a cross-sectional view of a building panel according to an embodiment of the present invention, the cross sectional being along the II line set forth in FIG. 1.

Referring to FIGS. 1 and 2, according to one embodiment, the acoustic building panel 10 is shown with the backing 200 covering the upper surface 111 and side surface 113 of the body 100. In this depiction, the acoustic building panel 10 has a rectangular shape having a length $L_p$ and a width $W_p$. The second side 201 of the backing 200 faces away from the body 100 as the backing 200 wraps around the body 100 portion of the acoustic building panel 10.

The acoustic building panel 10 comprises a first major surface 11 opposite a second major surface 12 and a side surface 13 extending there-between. The acoustic building panel 10 may have a body thickness to that as measured by the distance between the first major surface 11 to the second major surface 12.

The acoustic building panel 10 comprises a body 100 in contact with a backing 200. In certain embodiments, the backing 200 is adhered onto a surface of the body 100. In certain embodiments, various adhesion compositions may be used to accomplish the adhesion. In certain embodiments, the backing 200 may be laminated onto a surface of the body 100.

The body 100 comprises an upper surface 111 opposite a lower surface 112 and a side surface 113 that extends between the upper surface 111 and the lower surface 112, thereby defining a perimeter of the body 100. The body 100 may have a body thickness $t_1$ that as measured by the distance between the upper surface 111 to the lower surface 112 of the body 100. In certain embodiments, the second major surface 12 of the acoustic building panel 10 and the lower surface 112 of the body 100 are the same. In other embodiments (not pictured), the backing 200 may wrap the entirety of the body 100 and therefore, the second major surface 12 and the lower surface 112 of the body 100 are not the same.

Figure 6A:
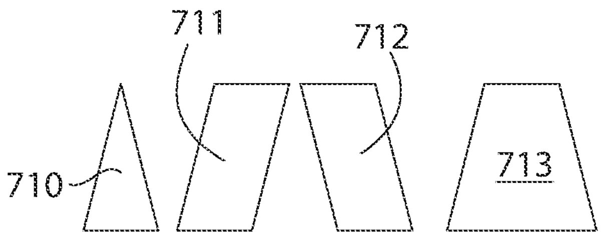
FIGS. 6 A-C show a plurality of ceiling panels of various shapes in accordance with exemplary embodiments of the invention.
Figure 6B:
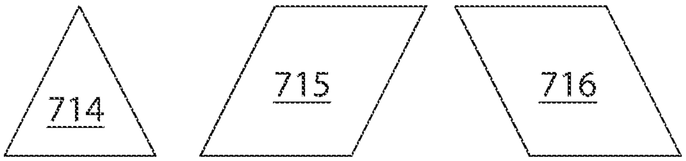
Figure 6C:
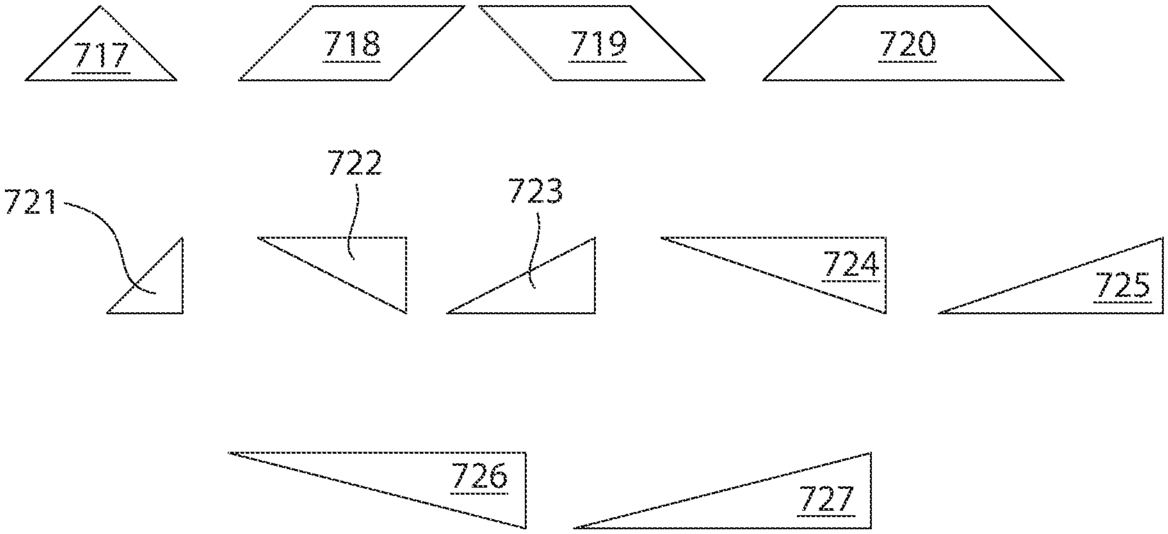

The body of the acoustic building panel may have various shapes and sizes. In certain embodiments, the acoustic building panels can have any desired shape. In certain embodiments, the panels shape may include polygons, round shapes, and irregular shapes. For example, the shape may be a triangle, square, rectangle, pentagon, hexagon, or any other polygon. For particular installations, other non-regular shapes may be required to, for example, fit around columns or other abnormalities in the ceiling plan. As further non-limiting examples, FIG. 6A shows a plurality of shapes 710, 711, 712, 713 using a nominal 75 degree angle with respect to a horizontal line. Other shapes having a nominal 75 degree angle can also be used such as, for example, a parallelogram shaped ceiling tile 711 or 712 having a longer or shorter base, or a trapezoid shaped ceiling tile 713 having a longer or shorter base. FIG. 6B shows a plurality of shapes 714, 715, 716 using a nominal 60 degree angle with respect to a horizontal line. Other shapes having a nominal 60 degree angle can also be used such as, for example, a parallelogram shaped ceiling tile 715 or 716 having a longer or shorter base, or a trapezoid shaped ceiling tile (not shown). FIG. 6C shows a plurality of shapes 717, 718, 719, 720, 721 using a nominal 45 degree angle with respect to a horizontal line. Other shapes having a nominal 45 degree angle can also be used such as, for example, a parallelogram shaped ceiling tile 718 or 719 having a longer or shorter base, or a trapezoid shaped ceiling tile 720 having a longer or shorter base. FIG. 6C also shows a plurality of shapes 722, 723, 724, 725, 726, 727 using other nominal angles with respect to a horizontal line. Other shapes having other nominal angles can also be used such as, for example, a parallelogram shaped ceiling tile, or a trapezoid shaped ceiling tile.

The distance between the upper surface and lower surface of the body may vary. In certain embodiments, the distance between the upper surface and lower surface is about 0.8 inches to about 2.5 inches. In certain embodiments, the distance between the upper surface and lower surface is about 0.8 inches to about 2.0 inches. In certain embodiments, the distance between the upper surface and lower surface is about 0.8 inches to about 1.2 inches. In certain embodiments, the distance between the upper surface and lower surface is about 1.0 inch.

The backing 200 comprises a first side 202 opposite a second side 201. The backing 200 may have a thickness $t_2$ as measured from the first side 202 to the second side 201.

The backing may be made from varying materials. In certain embodiments, the backing comprises denim, fiberglass, felt, nonwovens comprised of paper, animal wool, and bast fiber webs such as jute, kenaf, flax, sisal, hemp, or a combination thereof. In certain embodiments, the backing comprises denim. In certain embodiments, the backing comprises a fiberglass web. Such materials may be present in the backing from about 60 to about 80%, by weight. In certain embodiments, such materials are present in the backing from about 65 to about 75%, by weight. In certain embodiments, such materials may be present in the backing at about 70%, by weight.

The backing may be bound with a low melt polymeric bicomponent binder fiber. Use of a low-melt polyester bicomponent is particularly useful. Suitable low-melt polyester bicomponent fiber may include, but is not limited to, combinations using polyester, polypropylene, polysulfide, polyolefin, and polyethylene fibers. Specific polymer combinations for the bicomponent fibers include polyethylene terephthalate/polypropylene, polyethylene terephthalate/polyethylene, and polypropylene/polyethylene. Other non-limiting bicomponent fiber examples include copolyester polyethylene terephthalate/polyethylene terephthalate (coPET/PET), poly 1,4-cyclohexanedimethyl terephthalate/polypropylene (PCT/PP), high density polyethylene/polyethylene terephthalate (HDPE/PET), high density polyethylene/polypropylene (HDPE/PP), linear low density polyethylene/polyethylene terephthalate (LLDPE/PET), nylon 6/nylon 6,6 (PA6/PA6,6), and glycol modified polyethylene terephthalate/polyethylene terephthalate (6PETg/PET). In certain embodiments, the low-melt polyester bicomponent fiber comprises copolyester polyethylene terephthalate/polyethylene terephthalate (coPET/PET). In certain embodiments, the low melt polymeric bicomponent binder fiber is made from virgin or recycled polymer sources.

The low melt polymeric bicomponent binder fiber may be used in varying amounts. In certain embodiments, the low-melt polyester bicomponent fiber is present from about 10% to about 35%, by weight of the backing. In certain embodiments, the low-melt polyester bicomponent fiber is present from about 10% to about 30%, by weight of the backing. In certain embodiments, the low-melt polyester bicomponent fiber is present from about 15% to about 25%, by weight of the backing. In certain embodiments, the low-melt polyester bicomponent fiber is present from about 25% to about 35%, by weight of the backing. In certain embodiments, the low-melt polyester bicomponent fiber is present from about 28% to about 33%, by weight of the backing.

The backing may contain varying basis weight. In certain embodiments, the backing may have a basis weight from about 1150 g/$m^2$ to about 1400 g/$m^2$. In certain embodiments, the backing may have a basis weight from about 1200 g/$m^2$ to about 1350 g/$m^2$. In certain embodiments, the backing may have a basis weight of about 1250 g/$m^2$.

The backing may contain varying thickness. In certain embodiments, the backing has a thickness from about 0.75 inches to about 1.50 inches. In certain embodiments, the backing has a thickness from about 0.85 inches to about 1.40 inches. In certain embodiments, the backing has a thickness from about 0.85 inches to about 1.25 inches. In certain embodiments, the backing has a thickness from about 0.75 inches to about 1.25 inches. In certain embodiments, the backing has a thickness of about 1.0 inch.

In the depiction of FIG. 2, the backing 200 is shown to contact both the upper surface 111 and the side surface 113 of the body 100. In certain embodiments, the backing 200 is in contact with the upper surface 111, lower surface 112, and the side surface(s) 113 of the body 100. In certain embodiments, the backing 200 is in contact with only the upper surface 111 and the side surface(s) 113 of the body 100. In other embodiments, the backing 200 is in contact with only the upper surface 111 of the body 100.

Figure 3:
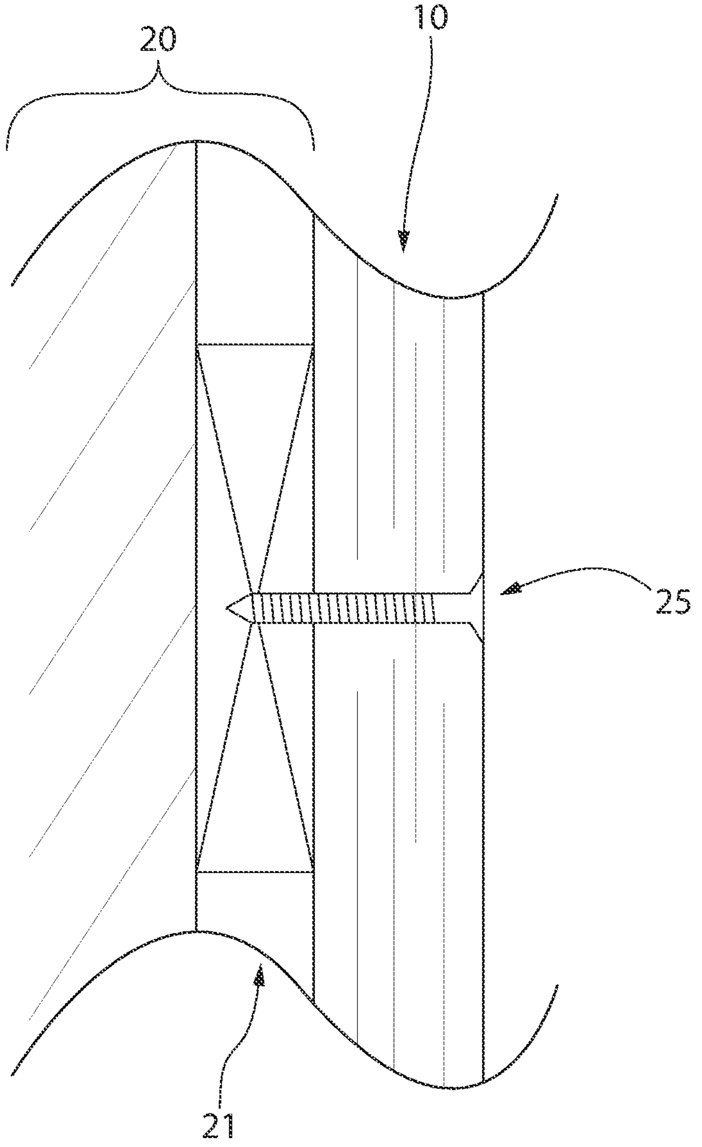
FIG. 3 is a side perspective view of a surface covering system according to one embodiment of the invention. The figure includes a building panel being attached to a furring strip.

Referring to FIG. 3, the acoustic building panel 10 may be directly attached to a substrate 20 by use of an attaching means 25. In this non-limiting depiction, the acoustic building panel 10 is attached to the substrate 20 with use of a screw as an attaching means 25. In other non-limiting embodiments, an adhesive or tape may be utilized. In this non-limiting depiction, the substrate 20 comprises a furring strip 21.

Figure 4:
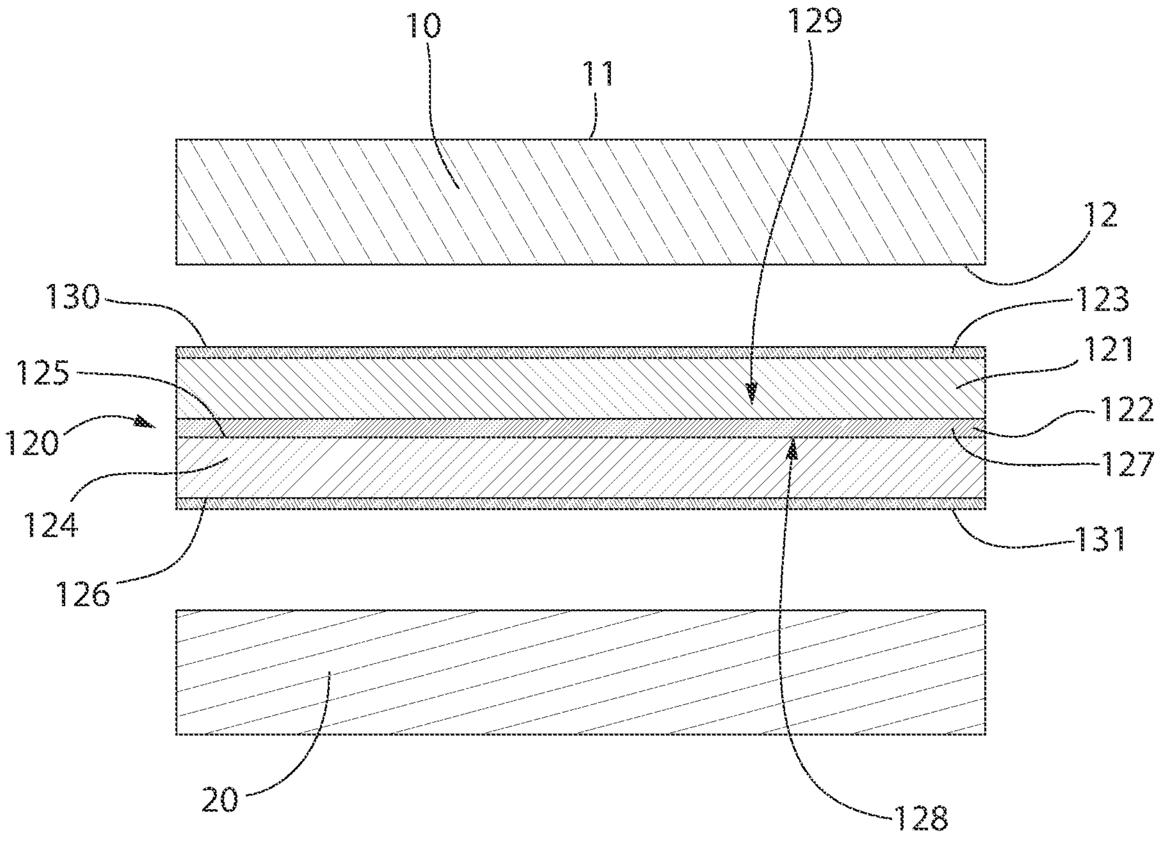
FIG. 4 is a schematic view of a surface covering system according to one embodiment of the invention. The figure includes a building panel, an adhesive tape, and a substrate.

Referring to FIG. 4, the acoustic building panel 10 may be detachably coupled, or attached, to a substrate 20 by use of an adhesive tape 120. Although FIG. 4 only illustrates one acoustic building panel 10 being coupled to the substrate 20, in certain embodiments the surface covering system comprises a plurality of the acoustic building panel 10, each of which is detachably coupled to the substrate 20 (see, for example, FIG. 5). Thus, in accordance with the invention set forth herein, a plurality of the acoustic building panels 10 may be coupled to the substrate 20 using the adhesive tape 120, as discussed more fully hereinafter. Specifically, a plurality of the acoustic building panels 10 may be detachably coupled to the substrate 20 (using the adhesive tape 120) in a side-by-side arrangement so that the acoustic building panels 10 collectively cover the substrate 20. As used herein, covering the substrate 20 includes partially covering the substrate 20 and/or covering an entirety of the substrate 20. A user can cover as much of the substrate 20 as he/she desires using one or more of the acoustic building panels 10 and the installation techniques described herein.

The substrate 20 may be any surface that is desirable to cover with one or more of the acoustic building panels 10. For example, the substrate 20 may be a wall to which wall panels are attached, or a ceiling to which ceiling panels are attached. The substrate 20 may be an interior wall (such as drywall, wood, or the like) or an exterior wall (such as siding, stucco, concrete, brick, wood, or the like). Thus, the substrate 20 may be formed of a variety of different materials or compositions, including without limitation wood, metal, brick, plastic, fabric, fibrous sheet, glass, ceramic, concrete, plastic film/sheet, paper, medium density fiberboard, fiberglass, mineral fiber sheet, drywall, or the like. In certain embodiments the substrate 20 may be drywall that may or may not be covered with paint, wallpaper, or the like. The substrate 20 is illustrated as being flat/planar in the exemplified embodiment, but the invention is not to be so limited in all embodiments and the substrate 20 may be curved in alternative embodiments. Furthermore, the substrate 20 may be horizontal (such as when the substrate is a floor or a ceiling), vertical (such as when the substrate 20 is a wall), or oriented at an angle. The exposed outer surface of the substrate 20 may be a smooth surface, a textured surface, or the like in various embodiments.

The adhesive tape 120 may be an integral laminate structure comprising a panel-side adhesive component 121 having a first surface 122 and a second surface 123 opposite the first surface 122, a substrate-side adhesive component 124 having a first surface 125 and a second surface 126 opposite the first surface 125, and a release component 127 having a first surface 128 and a second surface 129 opposite the first surface 128. In other embodiments the panel-side adhesive component 121 may not be integral with the substrate-side adhesive component 124, but rather these may be separate components that are only attached to one another when the acoustic building panel 10 are being installed on the substrate 20. Thus, the panel-side adhesive component 121 and the substrate-side adhesive component 124 may be maintained separately (such as in rolls or the like) until such time as they are needed to couple the acoustic building panel 10 to the substrate 20. In embodiments that maintain the panel-side and substrate-side adhesive components 121, 124 separately from one another, the release component 127 may be attached to one of the panel-side 121 or substrate-side adhesive components 124 or the release component may also be maintained separate from the panel-side 121 and substrate-side adhesive components 124. Regardless, when the building panel 10 is coupled to the substrate 20, the panel-side adhesive component 121, the substrate-side adhesive component 124, and the release component 127 are coupled together and collectively form the adhesive tape 120.

Figure 5:
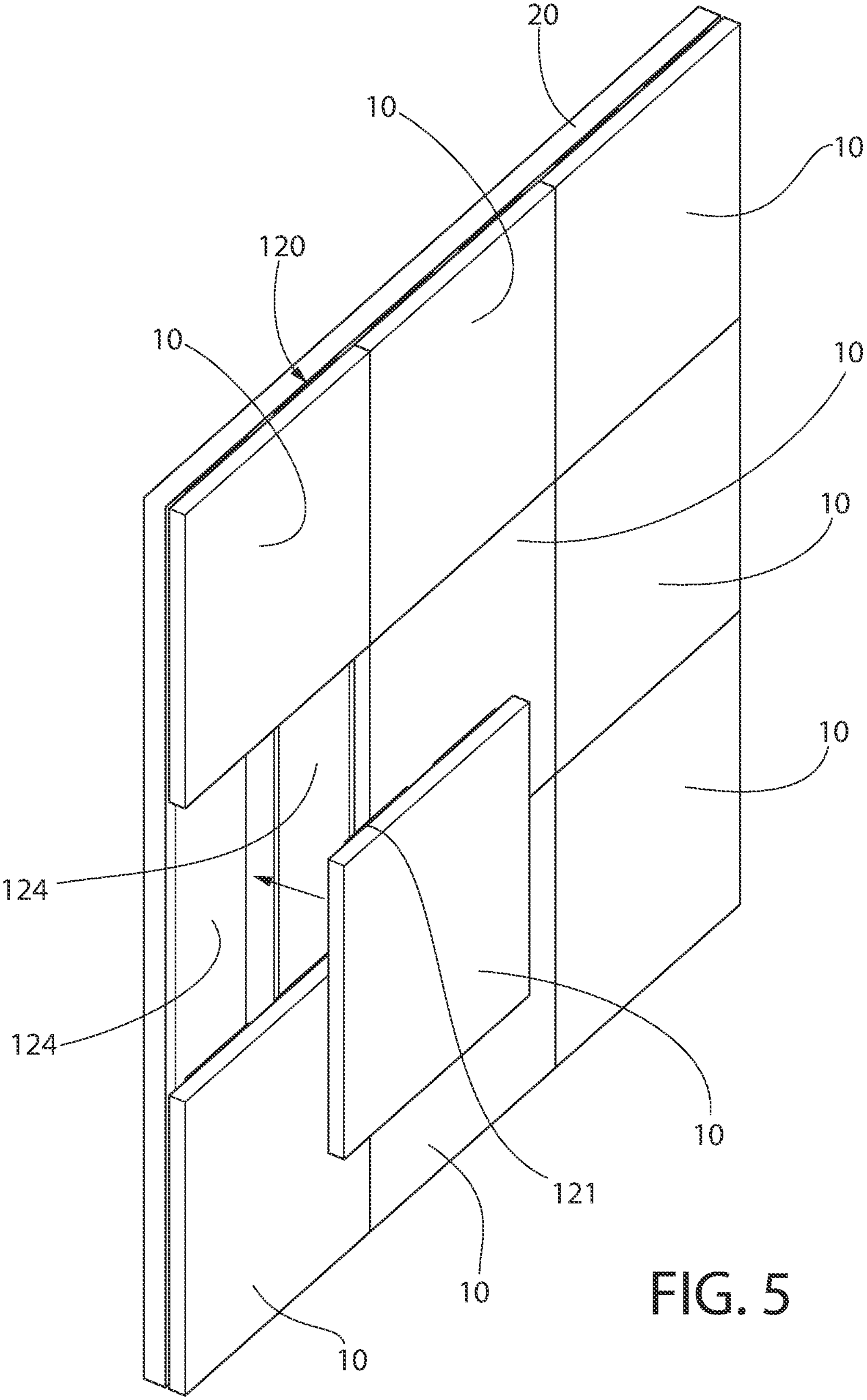
FIG. 5 is a perspective view illustrating a substrate having a plurality of panels thereon and illustrating an additional panel being coupled to the substrate.

FIG. 5 shows an embodiment of an arrangement of how the acoustic building panel 10 may fit onto a substrate 20. This figure shows a multitude of acoustic building panels 10 covering a substrate 20. In this figure, the substrate side adhesive component 124 is shown attached to the substrate 20 and the panel-side adhesive component 121 is shown attached to the acoustic building panel 10. In this figure one acoustic building panel 10 is shown being placed onto the substrate side adhesive component 124.

The acoustic building panel may comprise one or more fire retardants. Fire retardants may be included in the body, the backing, or a combination of both. In certain embodiments, the fire retardant comprises ammonium sulfate, ammonium phosphate, borates, or a combination thereof. In certain embodiments, the fire retardant is selected from magnesium oxide, sodium silicate, magnesium sulfate, calcium carbonate, ammonium polyphosphate, or a combination thereof. The one or more fire retardants may be present at various amounts or concentrations. In certain embodiments, the one or more fire retardants are present in an amount from about 10 wt. % to about 20 wt. %, about 12 wt. % to about 15 wt. %, or about 13 wt. %. In certain embodiments, ammonium sulfate may be present in an amount from about 10 to about 25 wt. %, about 10 to about 20 wt. %, about 12 wt. % to about 15 wt. %, or about 13 wt. %.

The acoustic building panel may be laminated using various adhesives known in the art. In certain embodiments, the adhesive is a two component cross-linking diisocyanate waterborne emulsion. In other embodiments, the adhesive is an aqueous polyvinyl acetate emulsion. In certain embodiments, a water based adhesive using emulsion polymer isocyanate may be used. In other embodiments, a polyurethane based adhesive may be used. In some embodiments the adhesive may be a pressure sensitive adhesive, a hot melt adhesive, or a combination thereof. In some embodiments, the adhesive comprises a hot melt adhesive. In some embodiments, the adhesive comprises a pressure sensitive adhesive. In some embodiments, the adhesive comprises polyvinyl acetate. In some embodiments, the adhesive comprises ethylene vinyl-acetate (EVA).

In certain embodiments, the adhesive may be used. Adhesive may be applied at about 8 to about 30 g/ft$^2$. In certain embodiments, the adhesive is applied at 10 to 25 g/ft$^2$. In certain embodiments, the adhesive is applied at about 12 to about 20 g/ft$^2$. In certain embodiments, the adhesive is a two component cross-linking diisocyanate waterborne emulsion applied at about 10 to about 25 g/ft$^2$. In certain embodiments, the adhesive is a two component cross-linking diisocyanate waterborne emulsion applied at about 15 to about 25 g/ft$^2$. In certain embodiments, the adhesive is an aqueous polyvinyl acetate emulsion applied at about 8 to about 25 g/ft$^2$. In certain embodiments, the adhesive is an aqueous polyvinyl acetate emulsion applied at 8 to 15 g/ft$^2$.

An important characteristic for building panel materials is the ability to reduce the amount of reflected sound in a room. One measurement of this ability is the Noise Reduction Coefficient (NRC) rating as described in ASTM test method C423. This rating is the average of sound absorption coefficients at various octave bands (e.g., 100, 250, 500, 1000, and 2000 Hz), where, for example, a system having an NRC of 0.90 has about 90% of the absorbing ability of an ideal absorber. A higher NRC value indicates that the material provides better sound absorption and reduced sound reflection. However, the sound absorption of a material that covers a flat surface depends not only on the physical properties of the material but also on the way in which the material is mounted over the surface. ASTM test method E75 provides test specimen mounting types (e.g., D-20, E-400) to be used during sound absorption tests. In certain embodiments, the acoustic building panel has a noise reduction coefficient (NRC) of about 0.65 to about 0.90 as determined in an E-400 mount. In certain embodiments, the acoustic building panel has a noise reduction coefficient (NRC) of about 0.90 as determined in an E-400 mount. In certain embodiments, the acoustic building panel has a noise reduction coefficient (NRC) of about 0.55 to about 0.60 as determined in a D-20 mount.

Another important characteristic for building panel materials is the burning performance. ASTM E84-20 provides methods to determine the relative burning behavior of the material. In particular, ASTM E84-20 provides methods for determining the Flame Spread Index (FSI) which characterizes how far flames generated on the test material spread. The FSI is measured from 0 (indicating no flames) to 200 (which indicates spreading flames). ASTM E84-20 also provides methods for determining the Smoke Developed Index (SDI) which states how much smoke is generated. SDI is measured on a scale of 0 to 450, which correlates to no smoke generated (value of 0) to thick, heavy smoke (value of 450). Obtained FSI and SDI values are then compiled and applied to a three-tiered class system: Class A, Class B, and Class C, with Class A rated materials producing minimal to no flames or smoke, while Class C materials producing the most flames or smoke. In order to qualify as an E84 Class A fire rating, a flame spread index (FSI) of 25 or less and smoke developed index at 450 or less must be exhibited. In certain embodiments, the acoustic building panel has a flame spread index (FSI) of about 0 to about 10, as determined by ASTM E84-20. In certain embodiments, the acoustic building panel has a flame spread index (FSI) of about 10 as determined by ASTM E84-20. In certain embodiments, the acoustic building panel has a flame spread index (FSI) of about 0 as determined by ASTM E84-20. In certain embodiments, the acoustic building panel has a smoke developed index (SDI) of about 5 or less as determined by ASTM E84-20.

In certain embodiments, the acoustic building panel has a noise reduction coefficient (NRC) of about 0.80, as determined in an A mount. In certain embodiments, the acoustic building panel has a noise reduction coefficient (NRC) of about 0.80, as determined in a D-20 mount. In certain embodiments, the acoustic building panel has a flame spread index (FSI) of about 25, as determined by ASTM E84-20. In certain embodiments, the acoustic building panel has a smoke developed index (SDI) of about 15, as determined by ASTM E84-20.

In certain embodiments, the acoustic building panel does not induce an itchiness to a upon handling of the panel.

The acoustic building panel may be attached to a substrate, thus creating a surface covering system. Without intending to be limited, the acoustic building panel may be included in a removable surface covering system using adhesive components as disclosed in U.S. Patent Application No. 2019/0270275, filed Mar. 2, 2019. In other embodiments, the acoustic building panel may be directly attached to a substrate using an attaching means, such as, but not limited to, a nail.

EXAMPLES

The examples and other implementations described herein are exemplary and not intended to be limiting in describing the full scope of compositions and methods of this disclosure. Equivalent changes, modifications and variations of specific implementations, materials, compositions, and methods may be made within the scope of the present disclosure, with substantially similar results.

Example 1: Various backings (Backings a-c) were prepared and analyzed. Backings were formed by mixing either fiberglass or denim fibers with a low-melt polyester bicomponent fiber comprising coPET/PET as a binder. Ammonium sulfate was applied to the fibers under heat and pressure and then dried and baled. The baled flame fibers are blended and air-laid to form the web backing for application onto a panel. Backings were added to building panels having a 1 inch thickness and comprising aspen wood excelsior. The panels further comprised magnesium oxide, sodium silicate, magnesium sulfate, and calcium carbonate.

Flame characterization was performed using ASTM International protocol E84 (or E-84). E-84 is the standard test method for assessing the surface burning characteristics of building products. The purpose of this test is to observe the flame spread along with a sample in order to determine the relative burning behavior of its material. Through the E84 test, both the Flame Spread Index (FSI) and Smoke Developed Index (SDI) are reported for a given sample. FSI is the measurement for the speed at which flames progress across the interior surface of a building, while SDI measures the amount of smoke a sample emits as it burns. In order to qualify as an E84 Class A fire rating, a flame spread index of 25 or less and smoke developed index at 450 or less must be exhibited. Flame characterization was performed either on a backing itself or on a panel having a backing.

Noise Reduction Coefficient (NRC) of the panels was analyzed. A Noise Reduction Coefficient is an average rating of how much sound an acoustic product can absorb. NRC ratings range from 0 to 1. An NRC of 0 means that the product absorbs no sound. An NRC of 1 means that the product absorbs all sound. In other words, the higher the NRC, the better the product is at soaking up sound. Regarding mounting types, the “A” mount refers to the panel being laid directly on the test chamber and the “D” mounting type corresponds to the panel being mounted on wood furring strips.

TABLE 1

Panels having various backings.

| Example | Backing | Backing composition | D-20 Mount NRC | A Mount NRC | Fire Spread Index | Smoke Developed Index | Effects During Installation |
|---|---|---|---|---|---|---|---|
| A | a | 90% fiberglass, 10% binder, 4.5 PCF | 0.85 | 0.85 | 25 or less | 50 or less | Itchy and irritant |
| B | b | 90% fiberglass, 10% binder, 3.75 PCF | 0.85 | 0.80 | 25 or less | 50 or less | Itchy and irritant |
| C | c | 70% denim, 30% binder, 2.79 PCF | 0.80 | 0.80 | 25 | 15 | No itchiness or irritation |

As shown in Table 1, backings comprised of fiberglass and the binder provided for beneficial NRC and fire resistant properties; however, such panels also caused itchy and irritating effects. Surprisingly, backings comprised of denim and binder provided for superior fire resistant qualities (qualifying as E-84 Class A) and did not induce itchiness upon handling.

Example 2: Characterization for effects of denim web basis weight towards performance. Denim web having basis weight of about 900 g/m$^2$ to about 1100 g/m$^2$ provided for poor NRC values and/or fire resistant properties, as did denim web having basis weight of about 1400 g/m$^2$ or more. Surprisingly, denim web having basis weight from about 1150 g/m$^2$ to about 1350 g/m$^2$ provided for superior NRC values and fire resistant qualities.

Example 3: Characterization for effects of binder amount towards performance. Use of the low-melt polyester bicomponent fiber comprising coPET/PET at below about 10%, by weight, or at above about 35%, by weight, provided for poor performance of the material during cut and fabrication. However, use of the binder at about 10% to about 35%, by weight, provided for panels which can be easily cut and fabricated, thus making installation efficient and easy.

Example 4: Characterization for effects of fire retardant amounts towards performance. Use of the ammonium sulfate fire retardant on both denim backing using coPET/PET bicomponent binder fiber was varied. Use of the fire retardant at below about 10%, by weight, or at above about 20%, by weight, provided for poor fire performance of the panel. However, application of the fire retardant at about 10% to about 20%, or more preferably at about 12% to about 15%, by weight of the panel, provided for panels having superior fire resistive qualities.

While the present invention has been described with reference to several embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention is to be determined from the claims appended hereto. Further, it will be apparent to those of skill in the art that numerous changes may be made in such details without departing from the spirit and the principles of the invention.

What is claimed is:

1. An acoustic building panel comprising a first major surface opposite a second major surface and a side surface extending there-between, the acoustic building panel comprising:

a body comprising an upper surface opposite a lower surface and a side surface extending there-between;

a backing having a first side opposite a second side and comprising denim web and a low-melt polyester bicomponent fiber;

wherein the first side of the denim web backing is in contact with the upper surface of the body;

wherein the denim web backing has a web basis weight from about 1150 to about 1350 g/m$^2$;

wherein the denim web is present from about 65% to about 75%, by weight of the backing; and wherein the low-melt polyester bicomponent fiber is present from about 10% to about 35%, by weight of the backing.

2. The acoustic building panel of claim 1, wherein the body comprises a nonwoven material.

3. The acoustic building panel of claim 1, wherein the body comprises aspen wood, non-woven perforated metal, or wood.

4. The acoustic building panel of claim 1, wherein the body comprises aspen wood excelsior.

5. The acoustic building panel of claim 1, wherein the distance between the upper surface and lower surface is about 0.8 inches to about 2.5 inches.

6. The acoustic building panel of claim 1, wherein the low-melt polyester bicomponent fiber comprises copolyester polyethylene terephthalate/polyethylene terephthalate (co-PET/PET).

7. The acoustic building panel of claim 1, wherein the low-melt polyester bicomponent fiber is present from about 28% to about 33%, by weight of the backing.

8. The acoustic building panel of claim 1, wherein the acoustic building panel further comprises a fire retardant.

9. The acoustic building panel according to claim 1, further comprising magnesium oxide, sodium silicate, magnesium sulfate, and calcium carbonate.

10. An acoustic building panel having a first major surface opposite a second major surface and a side surface extending there-between, the acoustic building panel comprising:

a body having an upper surface opposite a lower surface and a side surface extending there-between;

a backing having a first side opposite a second side and comprising denim web and a low-melt polyester bicomponent fiber;

wherein the first side of the denim web backing is in contact with the upper surface of the body;

ammonium sulfate;

wherein the denim web backing has a web basis weight from about 1150 to about 1350 $g/m^2$;

wherein the denim web is present from about 65% to about 75%, by weight of the backing; and wherein the low-melt polyester bicomponent fiber is present from about 10% to about 35%, by weight of the backing.

11. The acoustic building panel of claim 10, wherein the body comprises a nonwoven material.

12. The acoustic building panel of claim 10, wherein the body comprises aspen wood, non-woven perforated metal, or wood.

13. The acoustic building panel of claim 10, wherein the body comprises aspen wood excelsior.

14. The acoustic building panel of claim 10, wherein the distance between the upper surface and lower surface is about 0.8 inches to about 2.5 inches.

15. The acoustic building panel of claim 10, wherein the low-melt polyester bicomponent fiber comprises copolyester polyethylene terephthalate/polyethylene terephthalate (coPET/PET).

16. The acoustic building panel of claim 15, wherein the low-melt polyester bicomponent fiber is present from about 28% to about 33%, by weight.

17. The acoustic building panel according to claim 10, further comprising magnesium oxide, sodium silicate, magnesium sulfate, and calcium carbonate.

18. An acoustic building panel having a first major surface opposite a second major surface and a side surface extending there-between, the acoustic building panel comprising:

a body;

a backing comprising denim web and a low-melt polyester bicomponent fiber comprising copolyester polyethylene terephthalate/polyethylene terephthalate (coPET/PET) present from about 10% to about 35%, by weight of the backing; and wherein the denim web backing has a web basis weight from about 1150 to about 1350 $g/m^2$, and wherein the acoustic building panel has an NRC value of about 0.65 to about 0.9.

19. The acoustic building panel according to claim 18, wherein the body comprises a nonwoven material.

20. The acoustic building panel according to claim 18, further comprising magnesium oxide, sodium silicate, magnesium sulfate, and calcium carbonate.

* * * * *